(12) United States Patent
Kosako et al.

(10) Patent No.: US 7,751,698 B2
(45) Date of Patent: Jul. 6, 2010

(54) PHOTOGRAPHIC DEVICE WITH IMAGE GENERATION FUNCTION

(75) Inventors: Kosei Kosako, Tokyo (JP); Yasuhide Suzuki, Saitama (JP)

(73) Assignee: Hoya Corporation, Tokyo (JP)

( * ) Notice: Subject to any disclaimer, the term of this patent is extended or adjusted under 35 U.S.C. 154(b) by 734 days.

(21) Appl. No.: 11/681,913

(22) Filed: Mar. 5, 2007

(65) Prior Publication Data
US 2007/0212042 A1 Sep. 13, 2007

(30) Foreign Application Priority Data
Mar. 7, 2006 (JP) ............................... 2006-061096

(51) Int. Cl.
G03B 17/00 (2006.01)
H04N 5/228 (2006.01)
(52) U.S. Cl. ................. 396/55; 348/208.1; 348/208.12; 348/208.5
(58) Field of Classification Search .................... 396/55
See application file for complete search history.

(56) References Cited

U.S. PATENT DOCUMENTS

| 5,857,122 | A * | 1/1999 | Miyamoto et al. ............. 396/55 |
| 5,937,214 | A * | 8/1999 | Shintani et al. ............... 396/55 |
| 6,233,009 | B1 * | 5/2001 | Morofuji et al. ......... 348/208.8 |
| 6,573,930 | B2 * | 6/2003 | Kyuma et al. ............. 348/208.5 |
| 7,450,154 | B2 * | 11/2008 | Kojima et al. .......... 348/208.12 |
| 2005/0052538 | A1 * | 3/2005 | Sato et al. ................. 348/208.1 |
| 2005/0168586 | A1 * | 8/2005 | Tsubusaki ............... 348/208.99 |

FOREIGN PATENT DOCUMENTS

JP 2002-281373 9/2002

OTHER PUBLICATIONS

U.S. Appl. No. 11/615,503 to Kosako et al., which was filed on Dec. 22, 2006.
U.S. Appl. No. 11/625,891 to Kosako et al., which was filed on Jan. 23, 2007.
U.S. Appl. No. 11/681,826 to Kosako, which was filed on Mar. 5, 2007.
U.S. Appl. No. 11/681,872 to Kosako et al., which was filed on Mar. 5, 2007.

* cited by examiner

*Primary Examiner*—Melissa J Koval
(74) *Attorney, Agent, or Firm*—Greenblum & Bernstein P.L.C.

(57) ABSTRACT

A photographic device, according to the present invention, includes a shake detector, a shake mitigator, a shake mitigation commander, an operation member, and a controller. The shake detector detects a device shake that is a shake of the photographic device. The shake mitigator mitigates the effects of the device shake to reduce an image shake that is a shake of a photographed subject image. The shake mitigation commander commands the shake mitigator to mitigate the effects of the device shake. The operation member is operated for carrying out a predetermined operation. The controller assigns the role related to mitigating the effects of the device shake to the operation member, when the shake mitigation commander commands to mitigate the effects of the device shake.

10 Claims, 5 Drawing Sheets

|  | STANDARD OPERATION | ANTI-SHAKE OPERATION |
|---|---|---|
| ZOOM SW | OPTICAL ZOOM | DIGITAL ZOOM |
| IMAGE REPLAY SW | REPLAY IMAGE | SWITCH MODE |
| FOUR-DIRECTION SW | SET CAPTURE MODE | CHANGE ANTI-SHAKE CHARACTERISTICS |

FIG. 3

| | STANDARD OPERATION | ANTI-SHAKE OPERATION |
|---|---|---|
| ZOOM SW | OPTICAL ZOOM | DIGITAL ZOOM |
| IMAGE REPLAY SW | REPLAY IMAGE | SWITCH MODE |
| FOUR-DIRECTION SW | SET CAPTURE MODE | CHANGE ANTI-SHAKE CHARACTERISTICS |

PHOTOGRAPHIC DEVICE WITH IMAGE GENERATION FUNCTION

BACKGROUND OF THE INVENTION

1. Field of the Invention

The present invention relates to photographic devices having image generation functions, especially to those that can display and store generated images.

2. Description of the Related Art

Photographic devices which have an anti-shake function to prevent the effects of a shake caused by a hand shake, and so on, in a generated subject image have become widespread. For example, in digital cameras anti-shake functionality is achieved by moving an imaging device or a photographing lens, or by other methods.

On the other hand, in photographic devices such as digital cameras, various operational buttons and switches are provided for carrying out predetermined operations according to commands of a user.

A shake mitigation of a photographing device is mainly required when a subject is photographed; it is not required, for example, when an image that has been photographed is replayed. Providing a photographing device with operational buttons or switches only for operating an anti-shake function that is not always required, as mentioned above, may complicate the structure of the photographing device. Further, in such a photographing device, complicated operations that are required of such buttons or switches deteriorate the operability of the photographing device.

SUMMARY OF THE INVENTION

Therefore, an objective of the present invention is to provide a photographic device that has anti-shake functionality, simple structure, and superior operability.

A photographic device, according to the present invention, includes a shake detector, a shake mitigator, a shake mitigation commander, an operation member, and a controller. The shake detector detects a device shake that is a shake of the photographic device. The shake mitigator mitigates the effects of the device shake to reduce an image shake that is a shake of a photographed subject image. The shake mitigation commander commands the shake mitigator to mitigate the effects of the device shake. The operation member is operated for carrying out a predetermined operation. The controller assigns the role related to mitigating the effects of the device shake to the operation member, when the shake mitigation commander commands to mitigate the effects of the device shake.

BRIEF DESCRIPTION OF THE DRAWINGS

The present invention will be better understood from the description of the preferred embodiment of the invention set forth below, together with the accompanying drawings, in which:

FIG. 3 is a comparison table comparing switch functions when anti-shake operations are not carried out, to those when the anti-shake operations are carried out;

DESCRIPTION OF THE PREFERRED EMBODIMENT

Hereinafter, the embodiment of the present invention is described with reference to the attached drawings.

Figure 1:
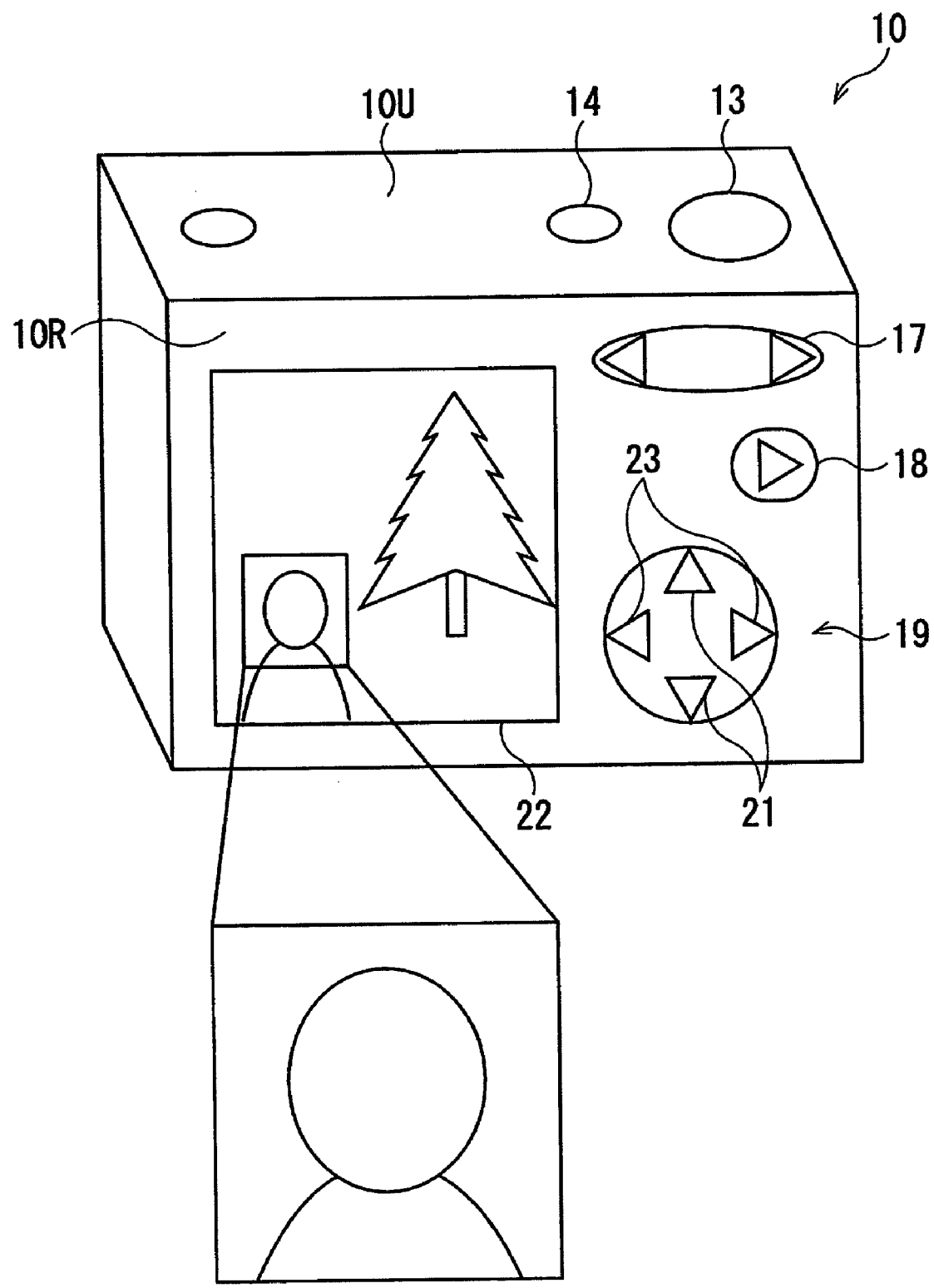
FIG. 1 represents a rear view of a digital camera of an embodiment of the present invention.

As shown in FIG. 1, on an upper surface 10U of a digital camera 10 (a photographic device), a release button 13, an anti-shake switch 14 for mitigating an image shake, and so on, are provided. On a rear surface 10R of the digital camera 10, a zoom switch 17 (a first operation member), an image replay switch 18 (a second operation member), and a four-direction switch 19 (a third operation member) are provided. The four-direction switch 19 includes up-down switches 21 (a first adjusting member) and left-right switches 23 (a second adjusting member). The up-down switches 21 and the left-right switches 23 each form a pair, as represented in FIG. 1.

Further, a monitor 22 is provided on the rear surface 10R, upon which a through image or a replayed image of a subject is displayed. A replayed image is displayed by depression of the image replay switch 18.

When the left or right area of the zoom switch 17 is depressed, a telephoto switch or a wide-angle switch is turned on. When the telephoto switch is on state, a subject image in which a part of a subject, such as a human face, is enlarged and displayed on the monitor 22. In the digital camera 10, in addition to an optical zoom function, a digital zoom function is also provided. Therefore, a subject image which is enlarged by the digital zoom function can be displayed, as explained below.

Figure 2:
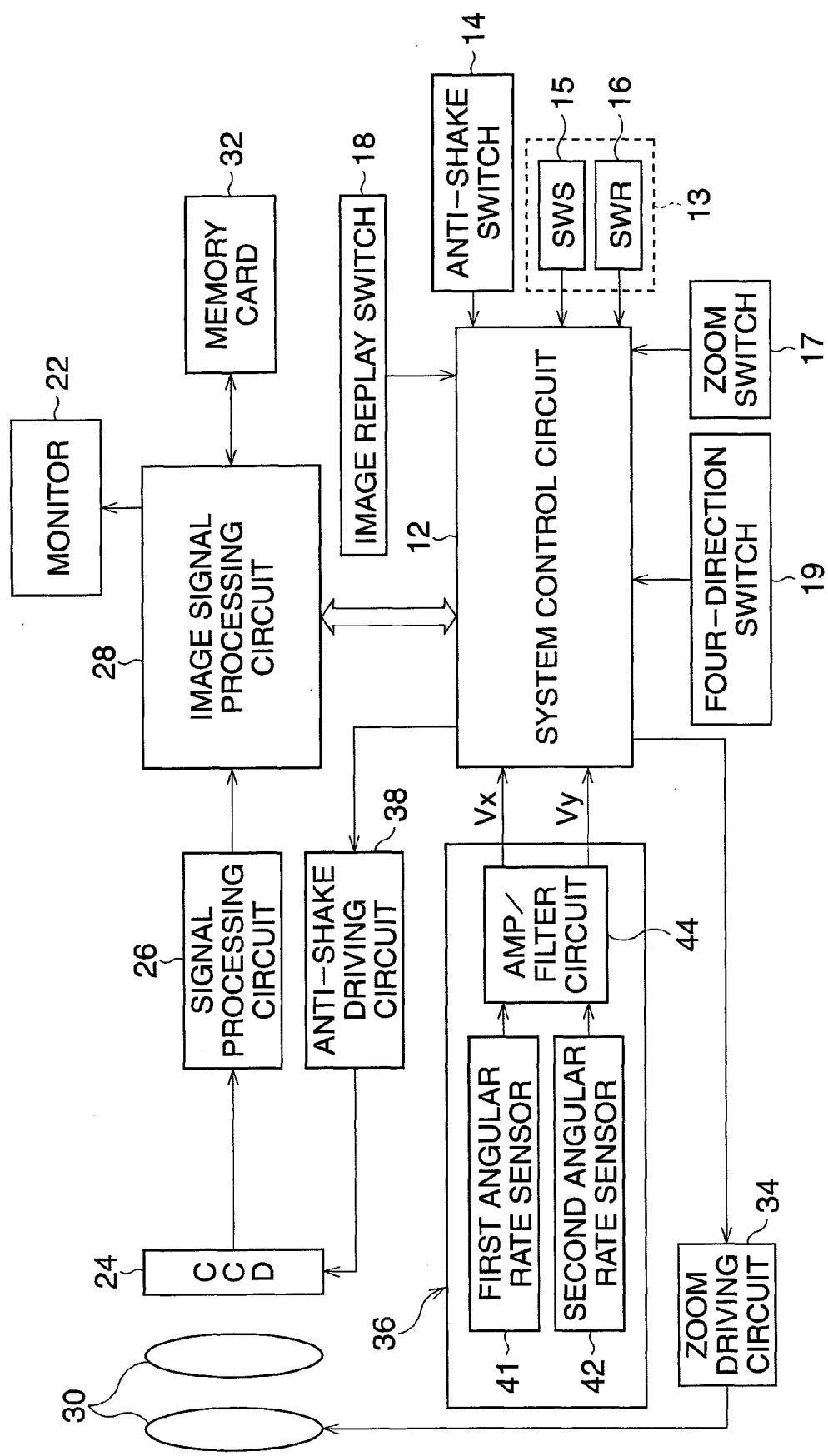
FIG. 2 is a block diagram of the digital camera.

As represented in FIG. 2, in the digital camera 10 a system control circuit 12 that controls the entire digital camera 10 is provided. The anti-shake switch 14, a photometry-measuring switch (SWS) 15, a release switch (SWR) 16, the zoom switch 17, the image replay switch 18 and the four-direction switch 19 are connected to the system control circuit 12. Signals corresponding to operations of these switches are transmitted to the system control circuit 12. Note that the photometry-measuring switch 15 and the release switch 16 are turned on by the operation of the release button 13.

The digital camera includes various modes of operation, such as a capture mode in which a subject is photographed and a still image of the subject is generated, and other modes which can be set by the operations of a menu button (not shown) and the cross key 14. When the capture mode is set, a subject image is displayed on the monitor 22 as a through image, before a still image is generated, as explained below.

First, a CCD 24 receives light reflected from a subject through a photographing lens 30 that is a zoom lens, resulting in electric charges corresponding to the subject being generated in the CCD 24. The electric charges read from the CCD 24, that is the image signals, are transmitted to a signal processing circuit 26, where they undergo a noise reduction process before being converted from analog signals to digital signals. The processed image signals are transmitted to an image signal processing circuit 28.

In the image signal processing circuit 28, various processes such as white balance adjustment, gamma correction, and so on are carried out on the digital image signals, and then luminance signals and color-difference signals are generated. The generated luminance signals and color-difference signals, that is the image data, are transmitted to the monitor 22. As a result, a subject image is displayed on the monitor 22 as a through image. Note that an interpolation process is carried out on image data representing a photographed subject at the image signal processing circuit 28, under the control of the system control circuit 12. That is, a digital zoom process to enlarge a subject image is carried out on the image data.

When the release button 13 is half-depressed, the photometry-measuring switch 15 is turned on. When the photometry-measuring switch 15 is on state, distance-measuring operations and photometric operations for measuring the luminance of a subject are carried out by a distance measurement element and a photometry measurement element (both of which are not shown), respectively. The distance and luminance data obtained from these operations are transmitted to the system control circuit 12. The system control circuit 12 controls a focusing operation based on the distance data, and calculates an exposure value based on the luminance data.

When the release button 13 is fully depressed, the release switch 16 is turned on, and then the shutter speed of a shutter (not shown) and an aperture value for an aperture (not shown) are set by the system control circuit 12. As a result, an aperture is opened a predetermined amount, a shutter is opened to a predetermined position for a predetermined length of time, and then the CCD 24 is exposed, thus generating image signals. Based on the generated image signals read from the CCD 24, a still image is generated and displayed on the monitor 22. The image data of the still image are stored in a memory card 32, and so on.

When the zoom switch 17 is operated, signals for telephotographing or wide-angle photographing are transmitted to the system control circuit 12, which then transmits command signals for adjusting the focal distance of the photographing lens 30 to a zoom driving circuit 34. As a result, the photographing lens 30 is moved to the position where the focal distance thereof is a predetermined value corresponding to the operation of the zoom switch 17.

In the digital camera, a shake detection circuit 36 (a shake detector) that detects a shake of the digital camera is provided. In the shake detection circuit 36, first and second angular rate sensors 41, 42, and an amplification/filter circuit 44 are included. A shake of the digital camera 10 in the X-direction or Y-direction is detected by the first or second angular rate sensors 41, 42, respectively.

Signals representing the magnitude of each detected shake in the X-direction and the Y-direction are transmitted to the amplification/filter circuit 44, where, predetermined processes are carried out on the signals representing the magnitude of the shake. As a result, X-direction shake signals Vx representing the magnitude of the shake in X-direction, and Y-direction shake signals Vy representing the magnitude of the shake in Y-direction, are transmitted to the system control circuit 12.

Based on the X-direction and Y-direction shake signals Vx and Vy output from the shake detection circuit 36, the system control circuit 12 transmits order signals to an anti-shake driving circuit 38 (a shake mitigator) to control the CCD 24 for shake reduction. The CCD 24 is slightly driven, that is, the CCD 24 is slightly moved a predetermined amount in a direction perpendicular to the optical axis of the photographing lens 30 by the anti-shake driving circuit 38 to mitigate the effects of a shake of the digital camera on a photographed subject image. As a result, the effects of a shake of the digital camera are mitigated or canceled out by the movement of the CCD 24, and an image with a subject that does not bear the effects of a shake can be generated.

The amplification/filter circuit 44 amplifies signals received from the first and second angular rate sensors 41, 42. Further, the amplification/filter circuit 44 transmits the X-direction and Y-direction shake signals Vx and Vy, which represent only the predetermined frequency ranges of the detected shake, to the system control circuit 12. At that time, the frequency range that is targeted for shake mitigation by the anti-shake driving circuit 38 can be adjusted, as explained below.

Further, the magnitude of the mitigation controlled by the anti-shake driving circuit 38 can also be adjusted. That is, total mitigation of the effects of a shake of the digital camera 10 detected by the first and the second angular rate sensors 41, 42 to correct an image shake is possible, as is partial mitigation of the effects of a detected shake by setting the maximum magnitude of shake mitigation, as explained below.

As explained above, the targeted frequency range and magnitude of shake mitigation efforts are adjustable in the X-direction and Y-direction so that suitable image shake mitigation can be accomplished for a variety of situations, for example, adjustable mitigation levels are useful for multiple users causing different amounts of hand shake of the digital camera, or for users requiring a partially remaining image shake to obtain a high speed image, or so on.

Note that shake mitigation by the shake detection circuit 36 and the anti-shake driving circuit 38 is carried out when the anti-shake switch 14 is on state, and command signals for activating the anti-shake driving circuit 38 and other components are transmitted to the system control circuit 12.

When the command signals are received by the system control circuit 12 (a controller), it assigns roles to the zoom switch 17 used for capturing a subject image and so on, the image replay switch 18, and the four-direction switch 19, for operations related to shake mitigation. That is, operations carried out in the digital camera 10 by the operations of the above switches are not constant and vary with respect to whether the anti-shake switch is on state or off state.

For example, as shown in FIG. 3, the zoom switch 17 is used for carrying out the optical zoom operations, that is, used for adjusting the zoom position of the photographing lens 30 in standard operation when the anti-shake operation is not carried out. On the other hand, the zoom switch 17 is used for enlarging or miniaturizing a subject image by the digital zoom operations when the anti-shake operation is carried out and shake mitigation by the anti-shake driving circuit 38 and other components has been commanded. As explained, when the anti-shake switch 14 is turned on, a different role is assigned to the zoom switch 17 than that assigned in standard operation, under the control of the system control circuit 12. When the anti-shake switch is turned off again, the zoom switch 17 is reassigned its original role.

The image replay switch 18, in standard operation, is used for setting a replay mode in which a subject image stored in the memory card 32 or other memory is replayed. On the other hand, when the anti-shake operation is carried out the image replay switch 18 is used for switching between a plurality of modes related to anti-shake operations. That is, the image replay switch 18 is used for switching between a mitigation mode (a first mode), in which the anti-shake driving circuit 38 mitigates the effects of a shake of the digital camera 10, and a non-mitigation mode (a second mode), in which the anti-shake driving circuit 38 does not operate regardless of whether a shake mitigation command was generated by the anti-shake switch 14. Note that when using the image replay switch 18 for switching between modes, a menu screen is displayed on the monitor 22 by depression of the menu button, and whichever mode that has been selected and is active at the present time is indicated on the menu screen.

The four-direction switch 19, in standard operation, is used for setting the capture mode, setting a timer, and turning on a flash. On the other hand, when the anti-shake operation is in effect, the four-direction switch 19 is used for adjusting anti-shake characteristics. That is, when the anti-shake switch 14 is on state and the menu screen is displayed, the degree to which the effects of the detected shake of the digital camera 10 are mitigated for reducing the image shake is adjusted by the operations of the up-down switches 21, and the frequency range of the effects of the device shake which are the object of the image shake mitigation is adjusted by the operations of the left-right switches 23.

Figure 4:
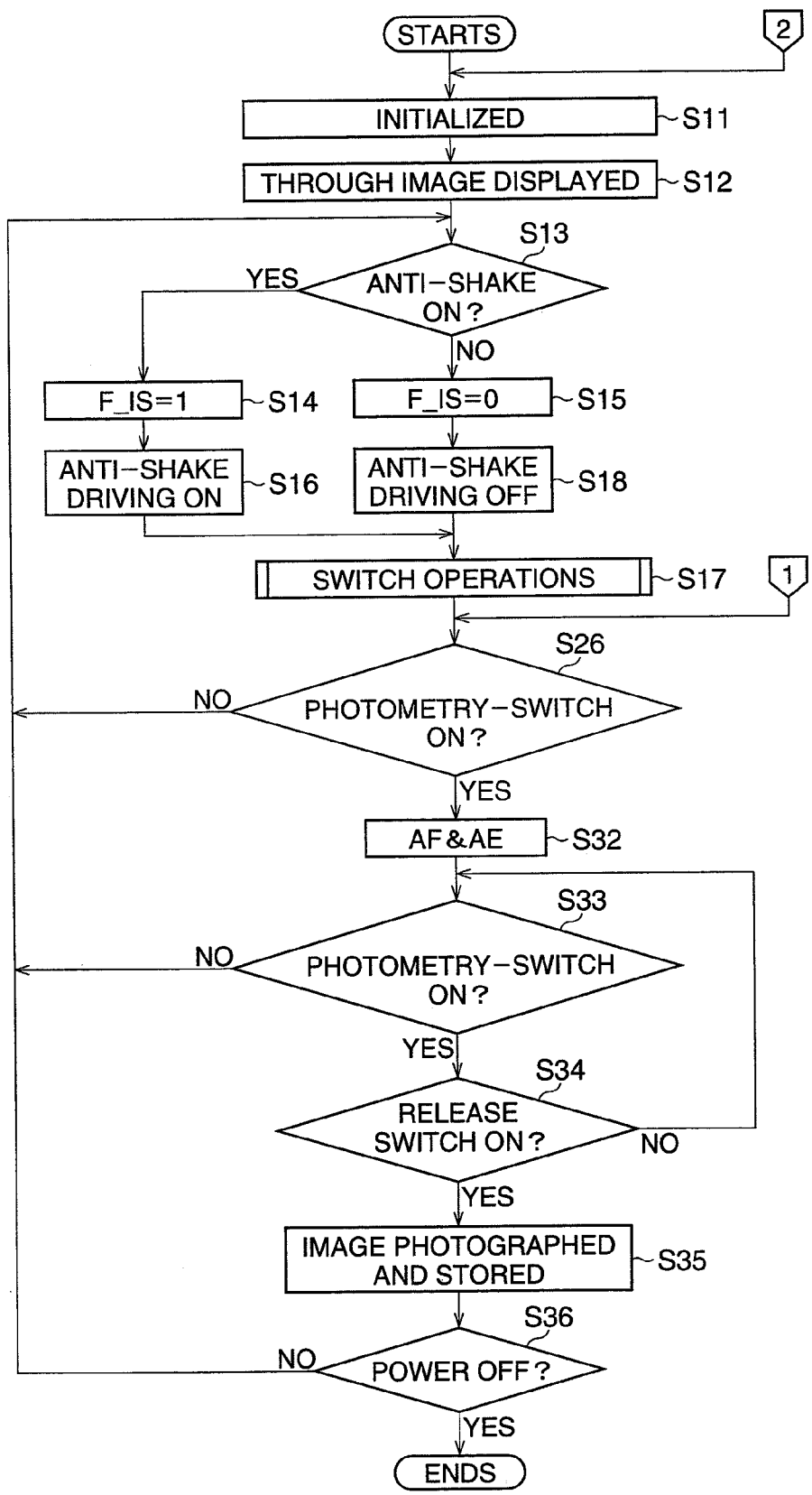
FIG. 4 is a flow chart representing a shake mitigation control routine.

The shake mitigation control routine (see FIG. 4) starts when the power source of the digital camera is turned on by operation of a main switch. At step S11, the digital camera 10 is initialized, and the process proceeds to step S12. At step S12, a subject image is displayed, then the process proceeds to step S13. At step S13, it is determined whether or not the anti-shake switch 14 is on state. When it is determined that the anti-shake switch 14 is on state, the process proceeds to step S14, otherwise the process proceeds to step S15.

At step S14, a flag "F_IS" representing whether or not an anti-shake operation has been commanded is set to 1, and the process proceeds to step S16. At step S16, the anti-shake driving circuit 38 and other elements related to anti-shake operation are turned on, and anti-shake operation is carried out. Then the process proceeds to step S17.

Figure 5:
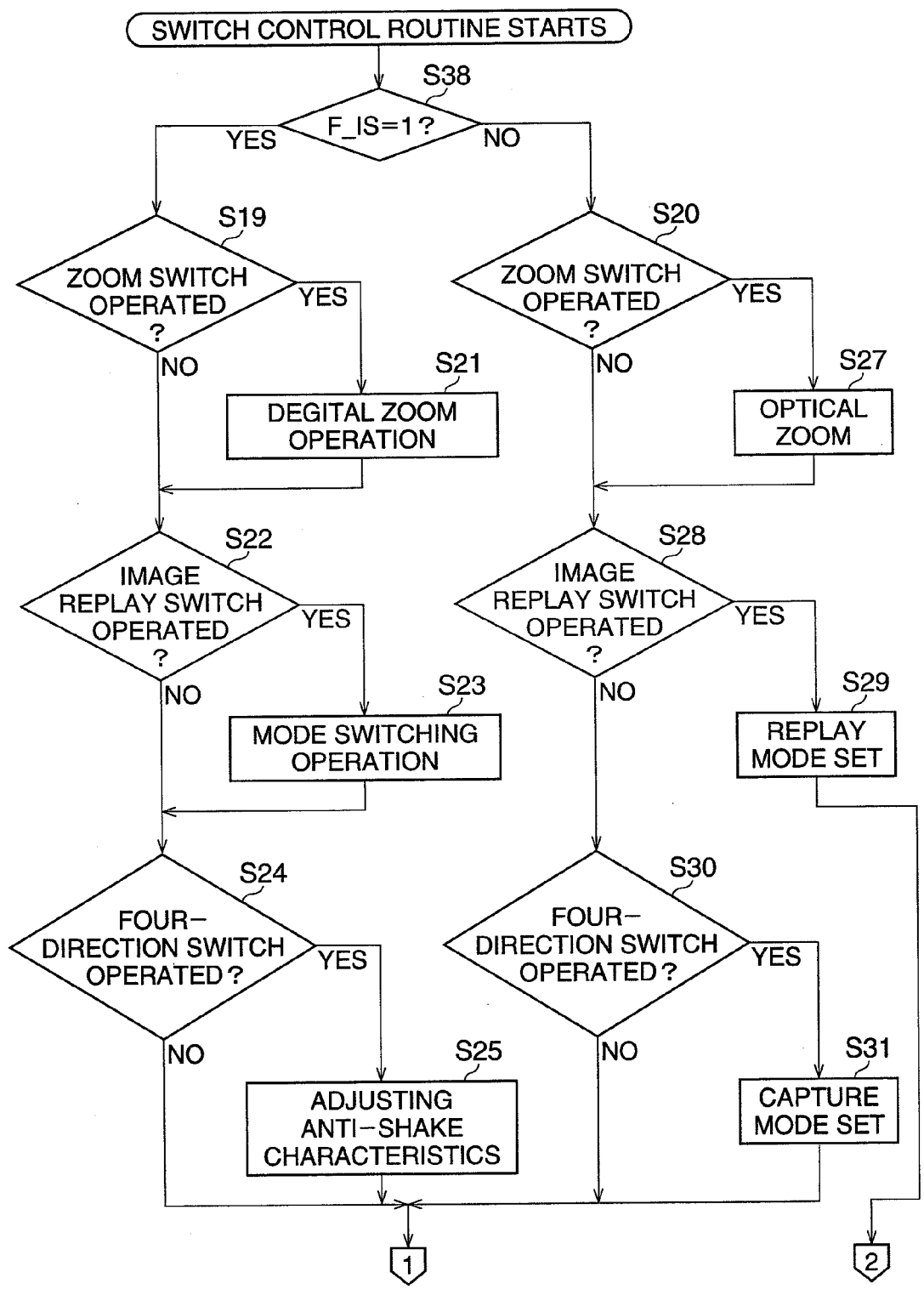
FIG. 5 is a flow chart representing a switch control routine that is part of the shake mitigation control routine.

On the other hand, at step S15, the flag "F_IS" is set to 0 and the process proceeds to step S18. At step S18, the anti-shake driving circuit 38 and other related elements are turned off, and the anti-shake operation is not carried out. Then the process proceeds to step S17. At step S17, the switch control routine (see FIG. 5) starts.

In the switch control routine, first it is determined whether or not the flag "F_IS" is 1 at step S38. When it is determined that the flag "F_IS" is 1, the process proceeds to step S19, otherwise the process proceeds to step S20.

At step S19, it is determined whether or not the zoom switch 17 is operated. When it is determined that the zoom switch is operated, the process proceeds to step S21, otherwise the process proceeds to step S22. At step S21, digital zoom operations, that is, operations for enlarging or miniaturizing a subject image displayed on the monitor 22, are carried out according to the operations of the zoom switch 17. Then the process proceeds to step S22.

At step S22, it is determined whether or not the image replay switch 18 is operated. When it is determined that the image replay switch 18 is operated, the process proceeds to step S23, otherwise the process proceeds to step S24. At step S23, mode switching operations, that is, switching between the mitigation mode and the non-mitigation mode are carried out according to the operations of the image replay switch 18, then the process proceeds to step S24.

At step S24, it is determined whether or not the four-direction switch 19 is operated. When it is determined that the four-direction switch 19 is operated, the process proceeds to step S25, otherwise the process proceeds to step S26 (see FIG. 4). At step S25, anti-shake characteristics, that is, the magnitude or the target frequency range of the mitigation of an image shake are adjusted according to the operations of the up-down switches 21 and left-right switches 23. The process then proceeds to step S26.

On the other hand, at step S20, it is determined whether or not the zoom switch 17 is operated, similarly to step S19. When it is determined that the zoom switch 17 is operated, the process proceeds to step S27, otherwise the process proceeds to step S28. At step S27, optical zoom operations, that is, operations for enlarging or miniaturizing a through image displayed on the monitor 22 are carried out according to the operations of the zoom switch 17. The process then proceeds to step S28.

At step S28, it is determined whether or not the image replay switch 18 is operated. When it is determined that the image replay switch 18 is operated, the process proceeds to step S29, otherwise the process proceeds to step S30. At step S29, the replay mode is set by the operation of the image replay switch 18, and operations such as replaying a subject image or displaying images in a slide show are carried out according to the button operated by a user. Afterwards, the process returns to step S11 when the capture mode is set (see FIG. 4).

At step S30, it is determined whether or not the four-direction switch 19 is operated. When it is determined that the four-direction switch 19 is operated, the process proceeds to step S31, otherwise the process proceeds to step S26 (see FIG. 4). At step S31, operations such as setting the capture mode, setting a timer, or so on are carried out, and the process proceeds to step S26.

At step S26, it is determined whether or not the photometry-measuring switch 15 is on state. When it is determined that the photometry-measuring switch 15 is on state, the process proceeds to step S32, otherwise the process returns to step S13. At step S32, the focus control operations and the exposure control operations are carried out, and the process proceeds to step S33.

At step S33, it is again determined whether or not the photometry-measuring switch 15 is on state, when it is determined that the photometry-measuring switch 15 is on state, the process proceeds to step S34, otherwise the process returns to step S13. At step S34, it is determined whether or not the release switch 16 is on state; when it is determined that the release switch 16 is on state, the process proceeds to step S35, otherwise the process returns to step S33.

At step S35, a subject is captured and a subject image is generated and stored in the memory card 32 or other memory, and the process proceeds to step S36. At step S36, it is determined whether or not the power source of the digital camera 10 is turned off. When it is determined that the power source of the digital camera 10 is turned off, the shake mitigation control routine ends, otherwise the process returns to step S13.

As explained above, in the digital camera 10 of the present embodiment, suitable roles are assigned to each switch according to whether the anti-shake operations are carried out or not, so that the operability of the digital camera 10 is superior to a comparable digital camera that does not include this feature. For example, when anti-shake operations are carried out, an enlarged subject image is displayed by digital zoom operations by the operations of the zoom switch 17, so that effects of the shake mitigation can be easily confirmed. Further, under the anti-shake operations, comparisons between subject images before and after anti-shake operations are easily made by the operations of the image replay switch 18. Finally, adjusting the magnitude and the target frequency range for the mitigation of an image shake are also easily carried out by the operations of the four-direction switch 19.

In the present embodiment, switches used in standard operations when the anti-shake operations are not carried out can be also used for operations related to image shake mitigation, so that the structure of the digital camera 10 having many functions can be simplified.

Although it is affixed to a digital camera in this embodiment, this device is not limited to use with a digital camera; that is, the anti-shake mechanism including the shake detection circuit 36, the anti-shake driving circuit 38, and multipurpose switches can be applied to other photographic devices. For example, the anti-shake mechanism and switches may be adapted to a video camera, a silver-halide camera, or a cellular phone with a photographing function.

Roles assigned to each switch are not limited to those in the present embodiment. For example, adjusting the target frequency of the shake of the digital camera 10 may be assigned to the up-down switches 21, and adjusting the magnitude of the shake mitigation may be assigned to the left-right switches 23. Further, for example, adjusting the magnitude of the shake mitigation may be assigned to each set of up-down switches 21 and left-right switches 23. In this case, the magnitude of the shake mitigation in the Y-direction may be adjusted by the operation of the up-down switches 21 and that in the X-direction may be adjusted by the operation of the left-right switches 23, so that the digital camera 10 has high operability. The improved operability results from the arrangement of the up-down switches 21 parallel to the Y-direction of the digital camera 10 and the arrangement of the left-right switches 23 parallel to the X-direction of the digital camera 10 (see FIG. 1), so that a user can intuitively distinguish the correct direction and magnitude from one of the four up-down and left-right switches 21 and 23 provided for increasing or decreasing the magnitude of the shake mitigation.

Further, only one of the maximum or minimum values may be set for the target frequency of the device shake, while both of the maximum and minimum values may be set for the magnitude of the shake mitigation.

Making pairs of the up-down switches 21 and the left-right switches 23 respectively, is preferable because it enhances the ease in which the operations for setting the maximum and minimum values for the magnitude of the image shake mitigation, and for setting the target range of the device shake frequency can be accomplished. However, one pair each of up-down switches 21 and left-right switches 23, or only one up-down switch 21 and one left-right switch 23 may be provided.

In standard operation when the anti-shake operation is not carried out, both roles of the optical and digital zoom can be assigned to the zoom switch 17, although it is preferable to assign only the role for the digital zoom to the zoom switch 17 during the anti-shake operation in order to achieve a prompt display of a shake mitigated image without time consuming adjustments of the zoom position of the photographing lens 30.

The method of shake mitigation is not limited to the driving of the CCD 24 by the anti-shake driving circuit 38 and other elements that are adopted in this embodiment. For example, driving the photographing lens 30, or processing the image signals generated by the CCD 24 may also be used to reduce the effect of a device shake on a subject image.

This invention is not limited to that described in the preferred embodiment, namely, various improvements and changes may be made to the present invention without departing from the spirit and scope thereof.

The present disclosure relates to subject matter contained in Japanese Patent Application No. 2006-061096 (filed on Mar. 7, 2006), which is expressly incorporated herein, by reference, in its entirety.

The invention claimed is:

1. A photographic device comprising:
    a shake detector that detects a device shake that is a shake of said photographic device;
    a shake mitigator that mitigates the effects of said device shake to reduce an image shake that is a shake of a photographed subject image;
    a shake mitigation commander that commands said shake mitigator to mitigate the effects of said device shake;
    an operation member that is provided on an external body surface of the photographic device and is configured for operation by a user to perform a process associated with photographing a picture, when mitigation of the effects of device shake is not commanded by the shake mitigation commander; and
    a controller that assigns a role to said operation member, said controller assigning the role related to mitigating the effects of said device shake, when said shake mitigation commander commands to mitigate the effects of said device shake, wherein the operation member serves as an input member to set a process associated with mitigating the effects of device shake and the controller controls a process associated with mitigating the effects of device shake in accordance with an input operation of the operation member.

2. The photographic device according to claim 1, said operation member comprising a plurality of operation members, said device further comprising a digital zoom member that enlarges said photographed subject image by an interpolation process, said controller assigning a role to a first operation member of said plurality of operation members, said role being related to enlarging said photographed subject image.

3. The photographic device according to claim 2, further comprising a photographing lens that is a zoom lens, said first operation member being a zoom switch that controls a zoom position of said photographing lens.

4. The photographic device according to claim 1, said operation member comprising a plurality of operation members, wherein said controller assigns a role to a second operation member of said plurality of operation members, said role being to switch between a first mode in which said shake mitigator mitigates the effects of said device shake and a second mode in which said shake mitigator does not mitigate the effects of said device shake regardless of a mitigation command by said shake mitigation commander.

5. The photographic device according to claim 4, further comprising an image replayer that replays said photographed subject image, said second operation member being an image replay switch that replays said photographed subject image.

6. The photographic device according to claim 1, said operation member comprising a plurality of operation members, wherein said controller assigns a role to a third operation member of said plurality of operation members, said role being to adjust at least one of either a magnitude of the mitigation of the effects of said device shake, or a frequency of the effects of said device shake which are objects of mitigation for said shake mitigator.

7. The photographic device according to claim 6, further comprising a capture mode setter that sets a capture mode for photographing said subject image, said third operation member being a mode setting switch that sets said capture mode.

8. The photographic device according to claim 6, wherein said third operation member comprises a first adjusting member for adjusting said magnitude of the mitigation of the effects of said device shake, and a second adjusting member for adjusting said frequency of the effects of said device shake, said first adjusting member and said second adjusting member forming a pair.

9. A photographic device comprising:
    a shake detector that detects device shake, the device shake comprising a shake of the photographic device;
    a shake mitigator that mitigates the effects of the device shake to reduce an image shake, the image shake comprising a shake of an image subject being photographed;
    a shake mitigation commander that commands the shake mitigator to mitigate the effects of the device shake;

an operation member that is operated to carry out a predetermined operation, the operation member comprising a plurality of operation members;

a controller that assigns a role to the operation member, the controller assigning the role related to mitigating the effects of the device shake, when the shake mitigation commander commands mitigation of the effects of the device shake, the controller assigning a role to a second operation member of the plurality of operation members, said role being to switch between a first mode in which the shake mitigator mitigates the effects of the device shake and a second mode in which the shake mitigator does not mitigate the effects of the device shake regardless of a mitigation command by the shake mitigation commander; and an image replayer that replays a photographed subject image, the second operation member comprising an image replay switch that replays the photographed subject image.

10. The photographic device according to claim 1, the process associated with photographing a picture being distinct from the process for mitigating the effect of device shake.

* * * * *